ced States

Schmerling

[11] 3,856,888
[45] Dec. 24, 1974

[54] FLAME RETARDANT COMPOSITIONS
[75] Inventor: Louis Schmerling, Riverside, Ill.
[73] Assignee: Universal Oil Products Company, Des Plaines, Ill.
[22] Filed: Apr. 26, 1974
[21] Appl. No.: 464,709

Related U.S. Application Data
[63] Continuation-in-part of Ser. No. 302,988, Nov. 1, 1972.

[52] U.S. Cl......... 260/881, 106/15 FP, 260/45.8 A, 260/45.85 T
[51] Int. Cl..... C08d 7/10, C08f 45/58, C08g 51/58
[58] Field of Search.... 260/45.8 A, 45.85 T, 514 G, 260/346.2 M, 346.3, 648 C, 648 D, 881 R; 106/15 FP

[56] References Cited
UNITED STATES PATENTS
3,017,431  1/1962  Schmerling.................... 260/514
3,050,567  8/1962  Schmerling..................... 260/648
3,152,172  10/1964  Roberts et al. .................. 260/468
3,265,745  8/1966  Seyferth et al..................... 260/648
3,346,597  10/1967  De Acetis....................... 260/346.3
3,418,384  12/1968  Stapp............................. 260/648

Primary Examiner—V. P. Hoke
Attorney, Agent, or Firm—James R. Hoatson, Jr.; Raymond H. Nelson; William H. Page, II

[57] ABSTRACT

Novel flame retardant compositions of matter comprise a mixture of a polymeric material and a polyhalo-substituted polyhydropolycyclicdicarboxylic acid or anhydride thereof. These novel compositions of matter may be exemplified by a mixture of polypropylene and 5,6,7,8,9,9-hexachloro-6,7-dibromomethylene-1,2,3,4,4a,5,8,8a-methano-2,3-naphthalenedicarboxylic anhydride.

8 Claims, No Drawings

FLAME RETARDANT COMPOSITIONS

CROSS-REFERENCE TO RELATED APPLICATIONS 5,6,7,8,9,9-hexachloro-6,7-dibromomethylene-1,2,3,4,4a,5,8,8a-octahydro-5,8-methano-2,3-naphthalenedicarboxylic This application is a continuation-in-part of my copending application Ser. No. 302,988 filed Nov. 1, 1972, all teachings of which are expressly incorporated herein by reference.

This invention relates to novel compositions of matter comprising a mixture of polymeric material which is flammable in nature and a polyhalosubstituted polyhydropolycyclicdicarboxylic acid or anhydride thereof. More specifically, the invention relates to these novel compositions of matter in which the aforesaid polyhalo-substituted polyhydropolycyclicdicarboxylic acid or anhydride thereof is characterized by possessing a dihalo-substituted methylene radical in a 3 membered ring.

It has now been discovered that novel flame retardant compositions of matter may be admixing a polyhalo-substituted polyhydropolycyclicdicarboxylic acid or anhydride thereof containing a dihalo-substituted methylene radical in a 3 membered ring with a polymeric material either synthetic or naturally occurring to nature to impart desired flame retardancy or fire resistant characteristics to the finished material. The aforementioned polyhalo-substituted polyhydropolycyclicdicarboxylic acids or anhydrides thereof are useful as additives to plastics, polymers, copolymers, terpolymers, resins, polycondensates, elastomers, rubbers, textiles and fibers, wood and paper, both naturally occurring and synthetic in nature, coatings, paints, varnishes, leather, foams, cellulose acetate butyrate, ethyl cellulose, cellulose propionate, polyolefins such as polyethylene and polyethylene copolymers, synthetic polyetehylene paper, polypropylene and polypropylene copolymers, polystyrenes, polystyrene copolymers, polyvinyl acetate or alcohol and copolymers, polyvinyl chloride and copolymers, polyvinylidene chloride and copolymers, polyesters, polyurethane, polyphenyl ethers, styrenated polyphenyl ethers, polycarbonates, polyamides, polyoxymethylenes, polyalkylene oxides such as polyethylene oxide, polyacrylates, polymethacrylates and their copolymers with styrene, butadiene, acrylonitrile, etc., epoxy resins, acrylonitrile-butadiene-styrene formulations (commonly known as ABS), polybutylene and acrylic ester-modified-styrene-acrylonitrile (ASA), etc., whereby the desired physical characteristics of flameproofing or fire retardancy will be imparted to the aforementioned materials. By utilizing the compounds of the present invention, a catalytic and/or synergistic action in which the fire retardance or flameproofing will be greatly enhanced will occur. This particular physical characteristic will possess special advantages when preparing plastics, polymers, resins, various rubbers, textiles, etc., which will be utilized in places which may be subjected to excessive heat or to the action of a possible flame, such places including architectural panels for construction work, wall plugs for electrical connections, soundproofing material in walls, ceilings, etc., under hood automotive use, heater ducts, cable and wire coatings, TV-cabinets, appliance housing, car or airplane interior components, automotive vents, etc., boat interiors or exteriors, cushions for various vehicle seats such as airplane seats, automobile seats, bus seats, etc. In addition, the compound when utilized as a constituent of paint, lacquer, varnishes, or protective coatings, films, etc., will also impart a flame resistance to these compounds and, therefore, render them commercially attractive as articles of commerce. Also, besides imparting the desirable physical characteristics of flame retardancy to the various articles of manufacture, the additives will render certain polymeric compositions of matter more stable to color changes and, therefore, will be important components of these compounds whenever it is desirable that discoloration of the finished product is to be avoided or will tend to render such articles unusable.

It is therefore an object of this invention to provide novel compositions of matter which possess desirable physical properties.

Another object of this invention is to provide novel compositions of matter which possess the desirable physical characteristics of flame retardancy or fire resistance, said compositions of matter comprising a mixture of a polymeric material and a polyhalo-substituted polyhydropolycyclicdicarboxylic acid or anhydride thereof.

In one aspect an embodiment of this invention is found in a flame retardant composition of matter comprising a polymeric material and a polyhalo-substituted polyhydropolycyclidicarboxylic acid or anhydride thereof having the formula:

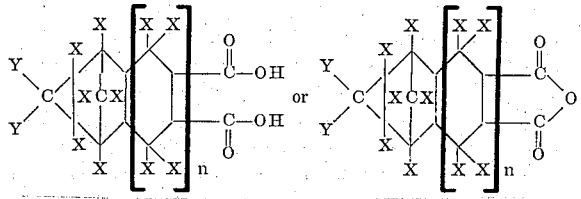

in which Y is chlorine or bromine, X is hydrogen or halogen, at least two X's being halogen, and $n$ is 0 or 1.

A specific embodiment of this invention is found in a novel flame retardant composition of matter comprising polypropylene and 5,6,7,8,9- hexachloro-6,7-dibromomethylene-1,2,3,4,4a,5,8,8a-octahydro-5,8-methano-2,3-naphthalenedicarboxylic anhydride.

Other objects and embodiments will be found in the following further detailed description of the present invention.

As hereinbefore set forth the process of the present invention is concerned with novel compositions of matter comprising a mixture of a polymeric material and a polyhalo-substituted polyhydropolicyclicdicarboxylic acid of anhydride thereof in which said acid or anhydride is characterized by containing a dihalo-substituted methylene in a 3 membered ring, said compositions of matter possessing certain characteristics such as the ability to retard flames or be fire resistant. The polyhalo-substituted polyhydropolycyclicdicarboxylic acid or anhydride which comprises one component of the novel composition of matter may be prepared by condensing a polyhalo-substituted polyhydropolycyclicdicarboxylic acid or anhydride thereof with a phenyl(trihalomethyl)mercury compound at reaction conditions which are hereinafter set forth in greater detail. Any suitable polyhalosubstituted polyhydropolycyclicdicarboxylic acid or anhydride thereof may be used in the preparation of the desired compound, said polyhalo-substituted polyhydropolycyclicdicarboxylic acid or anhydride thereof being illustrated by the following general formulae:

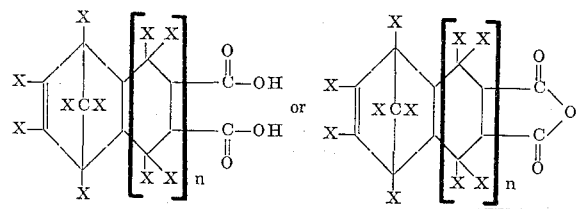

in which X is selected from the group consisting of hydrogen and halogen radicals (particularly chlorine and/or bromine), at least two of the X's being halogen and $n$ ranges from 0 to 1. Representative examples of these polyhalo-substituted polyhydropolycyclicdicarboxylic acids or anhydrides thereof which may be utilized include 1,4,5,6,7,7-hexachlorobicyclo[2.2.1]-5-heptene-2,3-dicarboxylic acid or anhydride thereof which may be prepared by condensing maleic acid or maleic anhydride with hexachlorocyclopentadiene, 1,4,5,6-tetrachlorobicyclo[2.2.1]-5-heptene-2,3-dicarboxylic acid or anhydride which may be prepared by condensing maleic acid or maleic anhydride with 1,2,3,4-tetrachloro-1,3-cyclopentadiene. Another example of the acid or anhydride which may be used comprises 5,-6,7,8,9,9-hexachloro-1,2,3,4,4a,-5,8,8a-octahydro-5,8-methano-2,3-naphthalenedicarboxylic acid or anhydride thereof which is prepared by condensing a conjugated aliphatic diene such as 1,3-butadiene with maleic acid or maleic anhydride and thereafter further condensing the resultant cyclohexene acid or anhydride thereof which is 1,2,3,6-tetrahydrophthalic acid or anhydride thereof with hexachlorocyclopentadiene to form the desired product. It is to be understood that the corresponding bromo-substituted compounds may be prepared in like manner by utilizing hexabromocyclopentadiene in place of the hexachlorocyclopentadiene. Likewise it is to be understood that other starting materials may also be utilized to form suitable acids or anhydrides, illustrative examples of these starting materials including other acids such as fumaric acid, itaconic acid, citraconic acid, glutaconic acid, etc.; conjugated aliphatic dienes including 2-methyl-1,3-butadiene, 1,3-pentadiene, 1,3-hexadiene, 2,4-hexadiene, 2,3-dimethyl-1,3-butadiene, 1,3-heptadiene, 2,4-heptadiene, conjugated octadienes, nonadienes, etc.; or other halo-substituted cycloalkadienes including 1,2-dichlorocyclopentadiene, 1,2,3-trichlorocyclopentadiene, 1,2,3,4-tetrachlorocyclopentadiene, 1,2,3,4,5-pentachlorocyclopentadiene and similar compounds in which all or part of the chlorine is replaced by other halogen atoms, particularly bromine.

The aforementioned polyhalo-substituted polyhydropolycyclicdicarboxylic acids or anhydrides thereof are condensed with a phenyl(trihalomethyl)mercury compound, the compound being characterized by containing at least one bromine atom, in a thermal reaction in the presence of a solvent of the type hereinafter set forth in greater detail. Examples of phenyl(trihalomethyl)mercury compounds which may be used will include phenyl(tribromomethyl)mercury, phenyl(dibromochloromethyl)mercury, phenyl(dichlorobromomethyl)mercury, etc.

The condensation is effected at elevated temperatures and preferably at the reflux temperature of the solvent which is utilized. These temperatures will range from about 30°C. up to about 150°C. Examples of substantially inert organic solvents which may be used will include the paraffinic solvents such as n-pentane, n-hexane, n-heptane, cyclopentane, cyclohexane, methylcyclopentane, cycloheptane, etc.; aromatic solvents such as benzene, toluene, the isomeric xylenes, ethylbenzene, etc. While the condensation is usually effected at atmospheric pressure, it is also contemplated within the scope of this invention that superatmospheric pressures ranging from 2 to 100 atmospheres or more may be utilized. If superatmospheric pressures are to be employed, the aforesaid pressure is afforded by the introduction of a substantially inert gas such as nitrogen into the reaction zone, the amount of pressure utilized being that which is sufficient to maintain a major portion of the reactants in the liquid phase.

The process in which the acid or anhydride which comprises one component of the novel composition of matter of the present invention may be effected in any suitable manner and may comprise either a batch or continuous type operation. For example, when a batch type operation is used, a quantity of the particular acid or anhydride and phenyl(trihalomethyl)-mercury compound is placed in an appropriate apparatus along with the particular solvent. The apparatus, which may comprise a condensation flask, or if superatmospheric pressures are to be employed, an autoclave of the rotating or mixing type, is provided with heating means whereby the vessel is heated to the particular desired operating temperature which is, as hereinbefore set forth, when using atmospheric pressure conditions, the reflux temperature of the solvent. The reaction is allowed to proceed for a predetermined residence time which may range from about 0.5 hours (or, occasionally, less) up to about 10 hours (or more), in duration. At the end of this time, the apparatus and contents thereof are allowed to cool to room temperature, the excess pressure, if any, is discharged and the reaction product is recovered. The product is separated from the solvent by conventional means such as distillation, by precipitation, by diluting the solvent with a non-solvent, evaporation, suction, filtration, extraction, etc. and subjected to conventional means of purification whereby the desired polyhalo-substituted polyhydropolycyclicdicarboxylic acid or anhydride thereof characterized by containing a dihalo-substituted methylene substituent on one of the rings is recovered.

It is also contemplated within the scope of this invention that the desired polyhalo-substituted polyhydropolycyclicdicarboxylic acid or anhydride containing the particular configuration which characterizes the novel compounds of this invention may be prepared by utilizing a continuous manner of operation. When such a type of operation is used, the starting materials comprising the particular acid or anhydride and the phenyl(trihalomethyl)mercury compound are continuously charged to a reactor which is maintained at the proper operating conditions of temperature and pressure. The solvent which is utilized in the reaction may be also charged to the reactor through a separate line or may be admixed with one or both of the starting materials prior to entry into said reactor and the mixture charged thereto in a single stream. Upon completion of the desired time, the reactor effluent is continuously withdrawn and the reaction product is isolated by conventional means of the type hereinbefore set forth, the unreacted starting material which may be present in the effluent being recycled to form a portion of the feed stock while the desired product comprising the polyhalo-substituted polyhydropolycyclicdicarboxylic acid or anhydride containing a dihalo-substituted methylene substituent on one of the rings being recovered.

The aforementioned polyhalo-substituted polyhydropolycyclicdicarboxylic acid or anhydride thereof containing a dihalo-substituted methylene in a 3 membered ring will possess the generic formula:

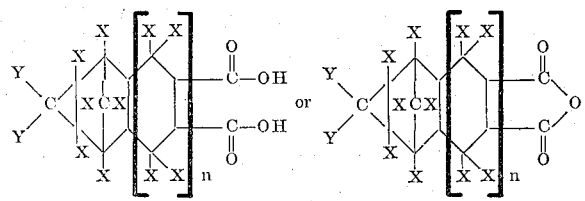

in which Y is chlorine or bromine, X is hydrogen or halogen, at least two X's being halogen and $n$ is zero or 1. Some representative illustrative examples of these compounds will include 5,8-dichloro-6,7-dibromomethylene-1,2,3,4,4a,5,8,8a-octahydro-5,8-methano-2,3-naphthalenedicarboxylic acid; 5,8-dichloro-6,7-dibromomethylene-1,2,3,4,4a,5,8,8a-octahydro-5,8-methano-2,3-naphthalenedicarboxylic anhydride, 5,6,7,8-tetrachloro-6,7-dibromomethylene-1,2,3,4,4a,5,8,8a-octahydro-5,8-methano-2,3-naphthalenedicarboxylic acid, 5,6,7,8-tetrachloro-6,7-dibromomethylene-1,2,3,4,4a,5,8,8a-octahydro-5,8-methano-2,3-naphthalenedicarboxylic anhydride, 5,6,7,8,9,9-hexachloro-6,7-dibromomethylene-1,2,3,4,4a,5,8,8a-octahydro-5,8-methano-2,3-naphthalenedicarboxylic acid; 5,6,7,8,9,9-hexachloro-6,7-dibromomethylene-1,2,3,4,4a,-5,8,8a-octahydro-5,8-methano-2,3-naphthalenedicarboxylic anhydride, 5,6-dibromo-6,7-dibromomethylene-1,2,3,4,4a,5,8,8a-octahydro-5,8-methano-2,3-naphthalenedicarboxylic acid; 5,6-dibromo-6,7-dibromomethylene-1,2,3,4,4a,5,8,8a-octahydro-5,8-methano-2,3-naphthalenedicarboxylic anhydride, 5,6,7,8-tetrabromo-6,7-dibromomethylene-1,2,3,4,4a,5,8,8a-octahydro-5,8-methano-2,3-naphthalenedicarboxylic acid; 5,6,7,8-tetrabromo-6,7-dibromomethylene-1,2,3,4,4a,5,8,8a-octahydro-5,8-methano-2,3-naphthalenedicarboxylic anhydride, 5,6,7,8,9,9-hexabromo-6,7-dibromomethylene-1,2,3,4,4a,-5,8,8a-octahydro-5,8-methano-2,3-napthalenedicarboxylic acid, 5,6,7,8,9,9-hexabromo-6,7-dibromomethylene-1,2,3,4,4a,5,8,8a-octahydro-5,8-methano-2,3-naphthalenedicarboxylic anhydride; 5,6,7,8-tetrachloro-6,7-dichloromethylene-1,2,3,4,4a,5,8,8a-octahydro-5,8-methano-2,3-naphthalenedicarboxylic acid, 5,6,7,8-tetrachloro-6,7-dichloromethylene-1,2,3,4,4a,5,8,8a-octahydro-5,8-methano-2,3-naphthalenedicarboxylic anhydride; 5,6,7,8,9,9-*hexachloro*-6,7-dichloromethylene-1,2,3,4,4a,5,8,8a-octahydro-5,8-methano-2,3-naphthalenedicarboxylic acid, 5,6,7,8,9,9-hexachloro-6,7-dichloromethylene-1,2,3,4,4a,-5,8,8a-octahydro-5,8-methano-2,3-naphthalenedicarboxylic anhydride, 1,4-dichloro-5,6-dibromomethylenebicyclo[2.2.1]heptane-2,3-dicarboxylic anhydride, 1,4-dichloro-5,6-dibromomethylenebicyclo[2.2.1]heptane-2,3-dicarboxylic acid, 1,4,5,6-tetrachloro-5,6-dibromomethylenebicyclo[2.2.1]heptane-2,3-dicarboxylic acid, 1,4,5,6-tetrachloro-5,6-dibromomethylenebicyclo[2.2.1]heptane- 2,3-dicarboxylic acid, 1,4,5,6-tetrachloro-5,6-dibromomethylenebicyclo[2.2.1]heptane-2,3dicarboxylic anhydride, 1,4,5,6,7,7-hexachloro-5,6-dibromomethylene-bicyclo[2.2.1]heptane-2,3-dicarboxylic acid, 1,4,5,6,7,7-hexachloro-5,6-dibromomethylenebicyclo[2.2.1]heptane-2,3-dicarboxylic anhydride, 1,4,5,6,7,7-hexachloro-5,6-dichloromethylenebicyclo[2.2.1]heptane-2,3-dicarboxylic acid, 1,4,5,6,7,7-hexachloro-5,6-dichloromethylenebicyclo[2.2.1]heptane-2,3-dicarboxylic anhydride, 1,4,5,6-tetrabromo-5,6-dibromomethylenebicyclo[2.2.1]-heptane-2,3-dicarboxylic acid, 1,4,5,6-tetrabromo-5,6-dibromomethylenebicyclo[2.2.1]heptane-2,3-dicarboxylic anhydride, 1,4,5,6,7,7-hexabromo-5,6-dibromomethylenebicyclo[2.2.1]heptane-2,3-dicarboxylic acid; 1,4,5,6,7,7-hexabromo-5,6-dibromomethylenebicyclo[2.2.1]heptane-2,3-dicarboxylic anhydride, 1,4,5,6-tetrabromo-5,6-dichloromethylenebicyclo[2.2.1]heptane-2,3-dicarboxylic acid, 1,4,5,6-tetrabromo-5,6-dichloromethylenebicyclo[2.2.1]-heptane-2,3-dicarboxylic anhydride; 1,4,5,6,7,7-hexabromo-5,6-dichloromethylenebicyclo[2.2.1]heptane-2,3-dicarboxylic acid, 1,4,5,6,7,7-hexabromo-5,6-dichloromethylenebicyclo[2.2.1]heptane-2,3-dicarboxylic anhydride, etc. It is to be understood that the aforementioned compounds are only representative of the class of compounds of the present invention and that said invention is not necessarily limited thereto.

The aforementioned polyhalo-substituted polyhydropolycyclicdicarboxylic acid or anhydride characterized by containing a dihalo-substituted methylene in a 3 membered ring may be composited with polymeric compounds of the type hereinbefore set forth to form novel flame retardant compositions of matter, said polymeric compounds comprising plastics, resins, polymers, copolymers, textiles, etc. For example, the polyhalo-substituted polyhydropolycyclicdicarboxylic acids or anhydrides may be used as additives to polyolefins such as polypropylene whereby the final product will possess advantageous physical properties such as an increased stability against deterioration, weathering, and aging which has been induced by chemical, physical or biological agents or radiation. In addition, the polyolefins will also possess a high ignition point as well as a high degree of flame retardancy. The acids or anhydrides may be added to the polyolefins such as polyethylene, polypropylene in a range of from about 5 to about 50 percent by weight of the polymeric material to be treated. Thereafter, it will be found that the oxygen index of the polyolefins will have been increased, while the burning rate will be decreased. Examples of other polymeric products will be treated with the acids or anhydrides of the type hereinbefore set forth will include epoxy resins such as the condensation product of epichlorohydrin with bisphenol-A. The epoxy resins in an uncured state will usually be thermoplastic and may range from low viscosity liquids to high melting point brittle solids. These resins may be cured by mixing the acid or anhydride with said resin and thereafter curing the mixture by treatment at an elevated temperature for a predetermined period of time. The resultant product will have the physical characteristics thereof altered to their desirable values as pertains to color stability and flame retardancy and thus be utilized for various purposes such as floor, wall or ceiling surfacings, as coatings, etc. In addition, some other types of polymeric compounds which may be treated with the acids or anhydrides of the type hereinbefore set forth will include polyphenyl ethers which have been extended by treatment with styrene, polycarbonates, polyesters, polyurethane foams, etc. The admixing of the novel acid or anhydride with the aforementioned polymers may be accomplished by any means known in the art such as, for example, by admixing the compounds in a mixer, by milling the components, or by extruding the components through a suitable apparatus after admixture thereof, the only criterion being that the two components of the mixture are thoroughly admixed in such a fashion so that the components are uniformly distributed through the finished product.

It is also contemplated within the scope of this invention that the novel flame retardant compositions of matter of the present invention comprising a polymeric material and the particular acid or anhydride may also contain a sufficient amount of a tin- and/or antimony-containing compound which will act as a synergist for the flame retardant property of said finished composition of matter by enhancing this desirable characteristic. Some specific examples of the tin and antimony compounds which may be used will include tin compounds in a tetravalent state such as tin dioxide, tin tetrachloride, methyltin trichloride, ethyltin trichloride, butyltin dichloride, dipropyltin dichloride, trimethyltin chloride, methyltin triacetate, dipropyltin diacetate, diethyltin dipropionate, diethyltin dimaleate, dibutyltin dimaleate, dibenzyltin dichloride, dimethyltin sulfide, diethyltin sulfide, dimethyltin bis(methylmercaptide), dibutyl tin bis(octhylmercaptide), diethoxytin bis(ethylmercaptide), tin tetrakis(methylmercaptide), diethyltin mercaptoacetate, dioctyltin mercaptoacetate, dilauryltin dithiobutyric acid ethyl ether, diethyl tin S,S'-bis(3,5,5trimethylhexylmercaptoacetate), dibutyltin S,S'-bis(phenoxyethylmercaptoacetate), dibutyltin S,S'-bis(diethyleneglycol laurate mercaptoacetate), antimony trioxide, antimony oxychloride, etc.

Examples of novel flame retardant compositions of matter comprising a mixture of a polymeric material and a polyhalo-substituted polyhydropolycyclicdicarboxylic acid or anhydride containing a dihalo-substituted methylene in a 3 membered ring will include a mixture of polypropylene and 5,6,7,8,9,9-hexachloro-6,7-dibromomethylene-1,2,3,4,4a,5,8,8a-octahydro-5,8-methano-2,3-naphthalenedicarboxylic acid, polypropylene and 5,6,7,8,9,9-hexachloro-6,7-dibromomethylene-1,2,3,4,4a,5,8,8a-octahydro-5,8-methano-2,3-naphthalenedicarboxylic anhydride, polypropylene and 5,6,7,8,9,9-hexachloro-6,7-dichloromethylene-1,2,3,4,4a,5,8,8a-octahydro-5,8-methano-2,3-naphthalenedicarboxylic acid, polypropylene and 5,6,7,8,9,9-hexachloro-6,7-dichloromethylene-1,2,3,4,4a,5,8,8a-octahydro-5,8-methano-2,3-naphthalenedicarboxylic anhydride; polypropylene and 1,4,5,6,7,7-hexachloror-5,6-dichloromethylenebicyclo[2.2.1]heptane-2,3-dicarboxylic acid, polypropylene and 1,4,5,6,7,7-hexachloro-5,6-dichloromethylenebicyclo[2.2.1]-heptane-2,3-dicarboxylic anhydride, polyethylene and 5,6,7,8,9,9-hexachloro-6,7-dibromomethylene-1,2,3,4,4a,5,8,8a-octahydro-5,8-methano-2,3-naphthalenedicarboxylic acid, polyethylene and 5,6,7,-8,9,9-hexachloro-6,7-dibromomethylene-1,2,3,4,4a,5,8,8a-octahydro-5,8-methano-2,3-naphthalenedicarboxylic anhydride, polyethylene and 5,6,7,8,9,9-hexachloro-6,7-dichloromethylene-1,2,3,4,4a,5,8,8a-octahydro-5,8-methano-2,3-naphthalenedicarboxylic acid, polyethylene and 5,6,7,-8,9,9-hexachloro-6,7,-dichloromethylene-1,2,3,4,4a,5,8,8a-octahydro-5,8-methano-2,3-naphthalenedicarboxylic anhydride, polyethylene and 1,4,5,6,7,7-hexachloro-5,6-dichloromethylenebicyclo[2.2.1]-heptane-2,3-dicarboxylic acid, polyethylene and 1,4,5,6,7,7-hexachloro-5,6-dichloromethylenebicyclo[2.2.1]heptane-2,3-dicarboxylic anhydride, ABS and 5,6,7,8,9,9-hexachloro-6,7-dibromomethylene-1,2,3,4,4a,5,8,8a-octahydro-5,8-methano-2,3-naphthalenedicarboxylic acid, ABS and 5,6,7,8,9,9-hexachloro-6,7-dibromomethylene-1,2,3,4,4a,5,8,8a-octahydro-5,8-methano-2,3-naphthalenedicarboxylic anhydride, ABS and 5,6,7,8,9,9-hexachloro-6,7-dichloromethylene-1,2,3,4,4a,5,8,8a-octahydro-5,8-methano-2,3-naphthalenedicarboxylic acid, ABS and 5,6,7,8,9,9-hexachloro-6,7-dichloromethylene-1,2,3,4,4a,5,8,8a-octahydro-5,8-methano-2,3-naphthalenedicarboxylic anhydride, ABS and 1,4,5,6,7,7-hexachloro-5,6-dichloromethylenebicyclo[2.2.1]heptane-2,3-dicarboxylic acid, ABS and 1,4,5,6,7,7-hexachloro-5,6-dichloromethylenebicyclo[2.2.1]heptane-2,3-dicarboxylic anhydride, epoxy resin and 5,6,7-8,9,9-hexachloro-6,7-dibromomethylene-1,2,3,4,4a,5,8,8a-octahydro-5,8-methano-2,3-naphthalenedicarboxylic acid, epoxy resin and 5,6,7,8,9,9-hexachloro-6,7-dibromomethylene-1,2,3,4,4a,5,8,8a-octahydro-5,8-methano-2,3-naphthalenedicarboxylic anhydride, epoxy resin and 5,6,7,8,9,9-hexachloro-6,7-dichloromethylene-1,2,3,4,4a,5,8,8a-octahydro-5,8-methano-2,3-naphthalenedicarboxylic acid, epoxy resin and 5,6,7,8,9-hexachloro-6,7-dichloromethylene-1,2,3,4,4a,5,8,8a-octahydro5,8-methano-2,3-naphthalenedicarboxylic anhydride, epoxy resin and 1,4,5,6,7,7-hexachloro-5,6dichloromethylenebicyclo[2.2.1]heptane-2,3-dicarboxylic acid, epoxy resin and 1,4,5,6,7,7-hexachloro-5,6-dichloromethylenebicyclo[2.2.1]heptane-2,3-dicarboxylic anhydride, polyphenyl ether and 5,6,7,8,-9,9-hexachloro-6,7-dibromomethylene-1,2,3,4,4a,5,8,8a-octahydro-5,8-methano-2,3-naphthalenedicarboxylic acid, polyphenyl ether and 5,6,7,8,9,9-hexachloro-6,7-dibromomethylene-1,2,3,4,4a,5,8,8a-octahydro-5,8-methano-2,3-naphthalenedicarboxylic anhydride, polyphenyl ether and 5,6,7,8,9,9-hexachloro-6,7-dichloromethylene-1,2,3,4,4a,5,8,8a-octahydro-5,8-methano-2,3-naphthalenedicarboxylic acid, polyphenyl ether and 5,6,7,8,9,9-hexachloro-6,7-dichloromethylene-1,2,3,4,-4a,5,8,8a-octahydro-5,8-methano-2,3-naphthalenedicarboxylic anhydride, polyphenyl ether and 1,4,5,6,7,7-hexachloro-5,6-dichloromethylenebicyclo[2.2.1]-heptane-2,3-dicarboxylic acid, polyphenyl ether and 1,4,5,6,7,7-hexachloro-5,6-dichloromethylenebicyclo[2.2.1]heptane-2,3-dicarboxylic anhydride, polyester and 5,6,7,8,9,9-hexachloro-6,7-dibromomethylene-1,2,3,4,4a,5,8,8a-octahydro-5,8-methano-2,3-naphthalenedicarboxylic acid, polyester and 5,6,7,8,9,9-hexachloro-6,7-dibromomethylene-1,2,3,4,4a,5,8,8a -octahydro-5,8- methano-2,3-naphthalenedicarboxylic acid, polyester and 5,6,7,8,9,9-hexachloro-6,7-dichloromethylene-1,2,3,4,4a,5,8,8a-octahydro-5,8-methano-2,3naphthalenedicarboxylic anhydride, polyester and 1,4,5,6,7,7-hexachloro-5,6-dichloromethylenebicyclo[2.2.1]heptane-2,3-dicarboxylic acid, polyester and 1,4,5,6,7,7-hexachloro-5,6-dichloromethylenebicyclo[2.2.1]heptane-2,3-dicarboxylic anhydride, etc.

The following examples are given to illustrate the novel flame retardant compositions of matter of the present invention. However, these examples are not intended to limit the generally broad scope of the present invention in strict accordance therewith.

EXAMPLE I

In this example 212 grams (0.5 mole) of 5,6,7,8,9,9-hexachloro-1,2,3,4,4a,5,8,8a-octahydro-5,8-methano-2,3-naphthalenedicarboxylic anhydride along with 258 grams (0.5 mole) of phenl(tribromomethyl)mercury and 200 cc. of benzene are placed in a 2-liter flask provided with heating, stirring and refluxing means. The mixture is heated to a temperature of 80° C. and maintained in a range of 80°–84° C. for a period of 4 hours. At the end of this time, heating is discontinued and the reaction mixture is allowed to return to room temperature. The reaction mixture is then treated by fractional distillation under reduced pressure to remove benzene and bromobenzene and the bottoms are allowed to stand. The crystals which formed on standing are washed with isopropyl alcohol, recrystallized and dried, said crystals being the desired product comprising 5,6,-7,8,9,9-hexachloro-6,7-dibromomethylene-1,2,3,4,4a,5,8,8a-octahydro-5,8-methano-2,3-naphthalenedicarboxylic anhydride.

EXAMPLE II

In this example 185.5 grams (0.5 mole) of 1,4,5,6,7,7-hexachlorobicyclo[2.2.1]-5-heptene-2,3-dicarboxylic anhydride which is prepared by condensing maleic anhydride with hexachlorocyclopentadiene along with 258 grams (0.5 mole) of phenyl(tribromomethyl)mercury and 200 cc. of benzene are placed in a 2-liter flask provided with heating, stirring and refluxing means. The mixture is heated to a temperature of 82° C. and refluxed thereat for a period of 8 hours. At the end of this time, heating is discontinued, the flask and contents thereof are allowed to return to room temperature and the mixture is recovered. The benzene solvent and bromobenzene are flashed off and the mixture allowed to cool, the crystal precipiate being formed upon standing. The crystals, which are recovered and washed and dried, comprising the desired product, namely 1,4,5,6,7,7-hexachloro-5,6-dibromomethylenebicyclo[2.2.1]heptane-2,3-dicarboxylic anhydride.

EXAMPLE III

As in Example I above, 220 grams (0.5 mole) of 5,6,-7,8,9,9-hexachloro-1,2,3,4,4a,5,8,8a-octahydro-5,8-methano-2,3-naphthalenedicarboxylic acid which is prepared by condensing 1,3-butadiene with maleic acid and thereafter further condensing the resultant cyclohexenedicarboxylic acid with hexachlorocyclopentadiene, 213 grams (0.5 mole) of phenyl(dichlorobromomethyl)mercury and 200 cc. of toluene are placed in an appropriate apparatus similar to that described in the above examples. The flask is then heated to a temperature of about 112° C. and refluxed at a temperature in the range of from 112°–115° C. for a period of 8 hours. Upon completion of the desired residence time, heating is discontinued and the flask and contents thereof are allowed to return to room temperature. The reaction mixture is treated in a manner similar to that set forth in Example I above whereby the desired crystals comprising 5,6,7,8,9,9-hexachloro-6,7-dichloromethylene-1,2,3,4,4a,5,8,8a-octahydro-5,8-methano-2,3-naphthalenedicarboxylic acid are recovered.

EXAMPLE IV

To a round-bottom 2-liter flask provided with heating, stirring and refluxing means is added 198 grams (0.5 mole) of 1,4,5,6,7,7-hexachlorobicyclo[2.2.1]-5-heptene-2,3-dicarboxylic acid, 213 grams (0.05 mole) of phenyl(dichlorobromomethyl)mercury and 200 cc. of toluene. As in Example III above, the mixture is heated to a temperature of 112° C. and refluxed in a range of from 112°–115° C. for a period of 8 hours. Upon completion of the desired residence time, the reaction mixture is allowed to cool to room temperature and the toluene solvent is removed by flashing and the crystals which form upon standing are washed, dried and recovered. These crystals comprise the desired product, namely, 1,4,5,6,7,7-hexachloro-5,6-dichloromethylenebicyclo[2.2.1]heptane-2,3-dicarboxylic acid.

EXAMPLE V

In this example 172 grams (0.5 mole) of 5,6,7,8-tetrachloro-1,2,3,4,4a,5,8,8a-octahydro-5,8-methano-2,3-naphthalenedicarboxylic anhydride, 258 grams (0.5 mole) of phenyl(tribromomethyl)mercury and 200 cc. of benzene are placed in a flask provided with heating, stirring and refluxing means. The mixture is heated to a temperature of 80° C. and refluxed at a temperature in the range of 80°–84° C. for a period of 8 hours, at the end of which time heating is discontinued and the mixture allowed to return to room temperature. The reaction mixture is then treated by flashing off the benzene solvent and allowing the crystals to crystallize out upon standing and cooling. The crystals are washed, recrystallized and recovered, said crystals comprising 5,6,7,8-tetrachloro-6,7-dibromomethylene-5,8-methano-2,3-naphthalenedicarboxylic anhydride.

EXAMPLE VI

To illustrate the efficiency of the aforementioned acids or anhydrides to act as flame retardant additives to polymeric compounds, a commercial high molecular weight polypropylene and 5,6,7,8,9,9-hexachloro-6,7-dibromomethylene-1,2,3,4,4a,5,8,8a-octahydro-5,8-methano-2,3-naphthalenedicarboxylic anhydride are admixed in such proportions that the finished novel composition of matter will contain 15 percent by weight of the polyhalosubstituted anhydride. The mixture is milled for a period of 5 minutes at a temperature of 185° C. and thereafter cut into strips which contain a glass cloth in the center of the strips to prevent dripping. In addition to the two compounds the polypropylene strip will contain 0.15 grams of a commercial antioxidant comprising a polyhydropolycyclic butane oxidation inhibitor. In addition to this strip of treated polypropylene, another strip of polypropylene which contains only the commercial antioxidant in like amount is prepared, said polypropylene strip also being provided with a glass cloth in the center of the strip to prevent dripping. The two strips are burned in a combustion apparatus similar to that described by C. P. Fennimore and J. F. Martin in the November, 1966 issue of Modern Plastics. The strip of polypropylene which contains only the oxidation inhibitor will be found to possess an oxygen index (the lowest mole fraction of oxygen sufficient to maintain combustion) of $n=0.180$. In contradistinction to this, the strip of polypropylene which contains the 5,6,7,8,9,9-hexachloro-6,7-dibromomethylene-1,2,3,4,4a,5,8,8a-octahydro-5,8-methano-2,3-naphthalenedicarboxylic anhydride will be found to have an oxygen index much greater than that of the untreated polypropylene as well as possessing a slower rate of burning.

EXAMPLE VII

Another novel composition of matter of the present invention is prepared by admixing a liquid epoxy resin having an epoxide equivalent weight of 190 and known in the trade as Epon 828 with 1,4,5,6,7,7-hexachloro-5,6-dibromomethylenebicyclo[2.2.1]heptane-2,3-dicarboxylic anhydride and heating the mixture until it becomes homogeneous. The homogeneous mixture is then poured into molds which are prepared from glass sheets using Teflon spacers. In addition, a mold release agent is also used to facilitate removal of the cured resins from the mold. In addition, the liquid epoxy resin which is not treated by the addition of the anhydride but contains the mold release agent is also poured into a second mold similar in nature to the first. The two molds are placed in an air circulating oven and allowed to cure for a period of 6 hours at a temperature of 110° C. The sheets are then removed from the mold, cut into strips and are evaluated for flame retardancy. The epoxy resin strip which contains the 1,4,5,6,7,7-hexachloro-5,6-dibromomethylenebicyclo[2.2.1]heptane-2,3-dicarboxylic anhydride will be found to possess a greater flame retardancy, and will also possess excellent heat distortion, temperature and hardness, as measured by a Shore durometer as contrasted to the epoxy resin which does not contain any flame retardant additive.

EXAMPLE VIII

A novel flame retardant composition of matter of the present invention is prepared by admixing 5,6,7,8,9,9-hexachloro-6,7-dichloromethylene-1,2,3,4,4a,5,8,8a-octahydro-5,8-methano-2,3-naphthalenedicarboxylic acid with a commercial acrylonitrile-butadiene-styrene (ABS) copolymer in such a proportion so that the finished composition of matter will contain 15 percent by weight of the acid. The resulting mixture after milling of elevated temperatures is cut into strips similar to the polypropylene strips of Example VI. In addition, a strip of commercial ABS polymer which does not contain the added acid is also prepared. The two strips are then subjected to a flammability test similar in nature to that described in Example VI above. The results of the test will show that the novel composition of matter of the present invention, namely, 5,6,7,8,9,9-hexachloro-6,7-dichloromethylene-1,2,3,4,4a,5,8,8a-octahydro-5,8-methano-2,3-naphthalenedicarboxylic acid and ABS will possess an oxygen index greater than the strip of ABS which does not contain the acid and in addition will also possess a rate of burning as measured in seconds per inch much slower than that of the untreated ABS polymer strip.

EXAMPLE IX

In like manner a mixture is made by admixing a polymer comprising polyphenylene ether which has been modified by styrene with 1,4,5,6,7,7-hexachloro-5,6-dichloromethylenebicyclo[2.2.1]heptane-2,3-dicarboxylic acid at an elevated temperature in order to insure that the mixture is homogeneous, the final compound containing 20 percent by weight of the acid. The mixture is then poured into molds and allowed to cool following which the composition of matter is recovered and cut into strips. These strips are compared with the other strips which contain only the polyphenylene ether (polyphenylene oxide) which is modified by styrene. A comparison of the oxygen index in a flammability test similar to that set forth in Example VI above will show that the oxygen index of the novel composition of matter is raised and the burning rate in air as measured by seconds per inch will be longer than that possessed by the strip of polyphenylene ether which has been modified with styrene, but which does not contain the 1,4,5,6,7,7-hexachloro-5,6-dichloromethylenebicyclo[2.2.1]heptane-2,3-dicarboxylic acid.

EXAMPLE X

A novel flame retardant composition of matter is prepared by admixing 80 grams of a commercial high molecular weight polypropylene with 20 grams of 5,6,7,8-tetrachloro-6,7-dibromomethylene-1,2,3,4,4a,5,8,8a-octahydro-5,8-methano-2,3-naphthalenedicarboxylic anhydride and 0.15 grams of a commercial antioxidant comprising a polyhydropolycyclic butane oxidation inhibitor. The mixture is milled for a period of 5 minutes at 85° C. and thereafter cut into strips. In like manner a second strip comprising the commercial high molecular weight polypropylene and the antioxidant is also admixed, milled and cut. The strips are then burned in a combustion apparatus similar to that described in Example VI above. The results of this test will show that the composition of matter comprising the polypropylene and 5,6,7,8-tetrachloro-6,7-dibromomethylene-1,2,3,4,4a,5,8,8a-octahydro-5,8-methano-2,3-naphthalenedicarboxylic anhydride will have a greater oxygen index and a slower rate or burning than the strip which contains only the polypropylene and the oxidation inhibitor.

I claim as my invention:

1. A flame retardant composition of matter comprising a polymeric material and a polyhalo-substituted polyhydropolycyclicdicarboxylic acid or anhydride thereof having the formula:

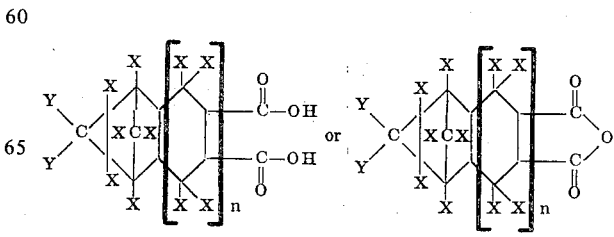

in which Y is chlorine or bromine, X is hydrogen or halogen, at least two X's being halogen, and n is 0 or 1.

2. The flame retardant comprises of claim 1 in which X is chlorine.

3. The flame retardant composition of claim 1 in which X is bromine.

4. The flame retardant composition of claim 1 in which said polymeric material is polypropylene and said anhydride is 5,6,7,8,9,9-hexachloro-6,7-dibromomethylene-1,2,3,4,4a,5,8,8a-octahydro-5,8-methano-2,3-naphthalenedicarboxylic anhydride.

5. The flame retardant composition of claim 1 in which said polymer material is epoxy resin and said anhydride is 1,4,5,6,7,7-hexachloro-5,6-dibromomethylenebicyclo[2.2.1]heptane-2,3-dicarboxylic anhydride.

6. The flame retardant composition of claim 1 in which said polymeric material is an acrylonitrile-butadiene-styrene copolymer and said acid is 5,6,7,8,9,9-hexachloro-6,7-dichloromethylene-1,2,3,4,4a,5,8,8a-octahydro-5,8-methano-2,3-naphthalenedicarboxylic acid.

7. The flame retardant composition of claim 1 in which said polymeric material is polyphenylene ether and said acid is 1,4,5,6,7,7-hexachloro-5,6-dichloromethylenebicyclo[2.2.1]heptane-2,3-dicarboxylic acid.

8. The flame retardant composition of claim 1 in which said polymeric material is polypropylene and said anhydride is 5,6,7,8-tetrachloro-6,7-dibromomethylene-1,2,3,4,4a,5,8,8a-octahydro-5,8-methano-2,3-naphthalenedicarboxylic anhydride.

* * * * *